(12) United States Patent
Vaarlid

(10) Patent No.: US 11,562,711 B2
(45) Date of Patent: Jan. 24, 2023

(54) HEADS-UP DISPLAY USING ELECTROCHROMIC ELEMENTS

(71) Applicant: Microchip Technology Incorporated, Chandler, AZ (US)

(72) Inventor: Johan Vaarlid, Trondheim (NO)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

(21) Appl. No.: 17/160,958

(22) Filed: Jan. 28, 2021

(65) Prior Publication Data

US 2021/0241713 A1 Aug. 5, 2021

Related U.S. Application Data

(60) Provisional application No. 62/968,864, filed on Jan. 31, 2020.

(51) Int. Cl.
*G09G 3/38* (2006.01)
*G09G 3/19* (2006.01)

(52) U.S. Cl.
CPC ............ *G09G 3/38* (2013.01); *G09G 3/19* (2013.01); *G09G 2354/00* (2013.01); *G09G 2380/10* (2013.01)

(58) Field of Classification Search
CPC ........ G09G 3/38; G09G 3/19; G09G 2354/00; G09G 2380/10
See application file for complete search history.

(56) References Cited

U.S. PATENT DOCUMENTS

| | | | |
|---|---|---|---|
| 7,420,727 B2 | 9/2008 | Cassidy | |
| 7,460,289 B2 | 12/2008 | Pichot et al. | |
| 8,907,918 B2 | 12/2014 | Ferreira et al. | |
| 10,300,849 B2 | 5/2019 | Barillot et al. | |
| 10,744,936 B1 * | 8/2020 | Budhia | ......... B60R 1/00 |
| 2002/0171081 A1 | 11/2002 | Vincent et al. | |
| 2005/0201585 A1 | 9/2005 | Jannard et al. | |
| 2008/0246748 A1 | 10/2008 | Cassidy et al. | |
| 2014/0070932 A1 | 3/2014 | Prasad et al. | |
| 2017/0323615 A1 | 11/2017 | Hazra et al. | |

(Continued)

FOREIGN PATENT DOCUMENTS

| | | | | |
|---|---|---|---|---|
| CN | 103946732 A * | 7/2014 | ......... | G02B 27/0093 |
| EP | 3031654 A1 * | 6/2016 | ............... | B60J 3/04 |

(Continued)

OTHER PUBLICATIONS

Naijoh et al., "Multi-Layered Electrochromic Display," RICOH Company, Ltd., Research and Development Group, EP1-1, (2011), pp. 375-378.

(Continued)

*Primary Examiner* — Ricardo Osorio
(74) *Attorney, Agent, or Firm* — TraskBritt

(57) ABSTRACT

Some embodiments of the present disclosure relate to a heads-up display (HUD) system. The HUD system may include a transparent support structure, an electrochromic element, and a HUD controller. The electrochromic element may be affixed to a surface of a transparent material. The HUD controller may be electrically coupled to the electrochromic element and configured to control translucence of the electrochromic element via control signals.

22 Claims, 9 Drawing Sheets

(56) References Cited

U.S. PATENT DOCUMENTS

2018/0003966 A1      1/2018  Kilcher et al.
2019/0317458 A1*    10/2019  Shrivastava ............ G02F 1/163
2020/0018976 A1      1/2020  Van et al.
2021/0026134 A1*     1/2021  Harkins ............. G02B 27/0101

FOREIGN PATENT DOCUMENTS

JP         2017021148 A   *   1/2017
WO         2013/137758 A1      9/2013
WO     WO-2019236680 A1  *  12/2019  ............... E06B 9/24

OTHER PUBLICATIONS

International Search Report from International Application No. PCT/US2021/015455, dated Apr. 20, 2021, 5 pages.
International Written Opinion from International Application No. PCT/US2021/015455, dated Apr. 20, 2021, 10 pages.

\* cited by examiner

HEADS-UP DISPLAY USING ELECTROCHROMIC ELEMENTS

CROSS-REFERENCE TO RELATED APPLICATIONS

This application claims the benefit under 35 U.S.C. § 119(e) of U.S. Provisional Patent Application Ser. No. 62/968,864, filed Jan. 31, 2020, entitled "DISPLAY USING TRANSPARENT ELECTROCHROMIC ELEMENTS," the disclosure of which is hereby incorporated herein in its entirety by this reference.

FIELD

Embodiments of the present disclosure relate, generally, to a heads-up display including transparent electrochromic elements, and methods of controlling the same.

BACKGROUND

Electrochromism is a phenomenon where the color or opacity of an electrochromic material changes when voltage is applied to the electrochromic material. One application of electrochromic materials is to include electrochromic materials in or layered onto windows as a tinting material to provide windows that are capable of blocking certain wavelengths of light when the electrochromic material is activated. Windows including electrochromic materials have been dubbed "smart windows."

The need to review critical information while operating a vehicle, performing sporting activities, or performing other activities is a cause of accidents because a user must stop looking at their surroundings in order to view a display, such as an automotive dashboard, a wearable device or a smart phone. Heads-up (HUD) displays present information in a user's line of sight, but HUDs known to the inventor of this disclosure are typically not flexible in terms of production and must be carefully designed for each and every application. A typical HUD known to the inventor of this disclosure includes three components: a projector unit, a combiner, and a video generation computer and produces an image where the light is collimated, i.e., the focal point is perceived to be at infinity.

The inventor of this disclosure appreciates that it would be desirable to have a HUD method and device easily adaptable to multiple transparent mediums, and optionally without (or to a reduced degree) some or all of the disadvantages of conventional HUDs discussed above.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
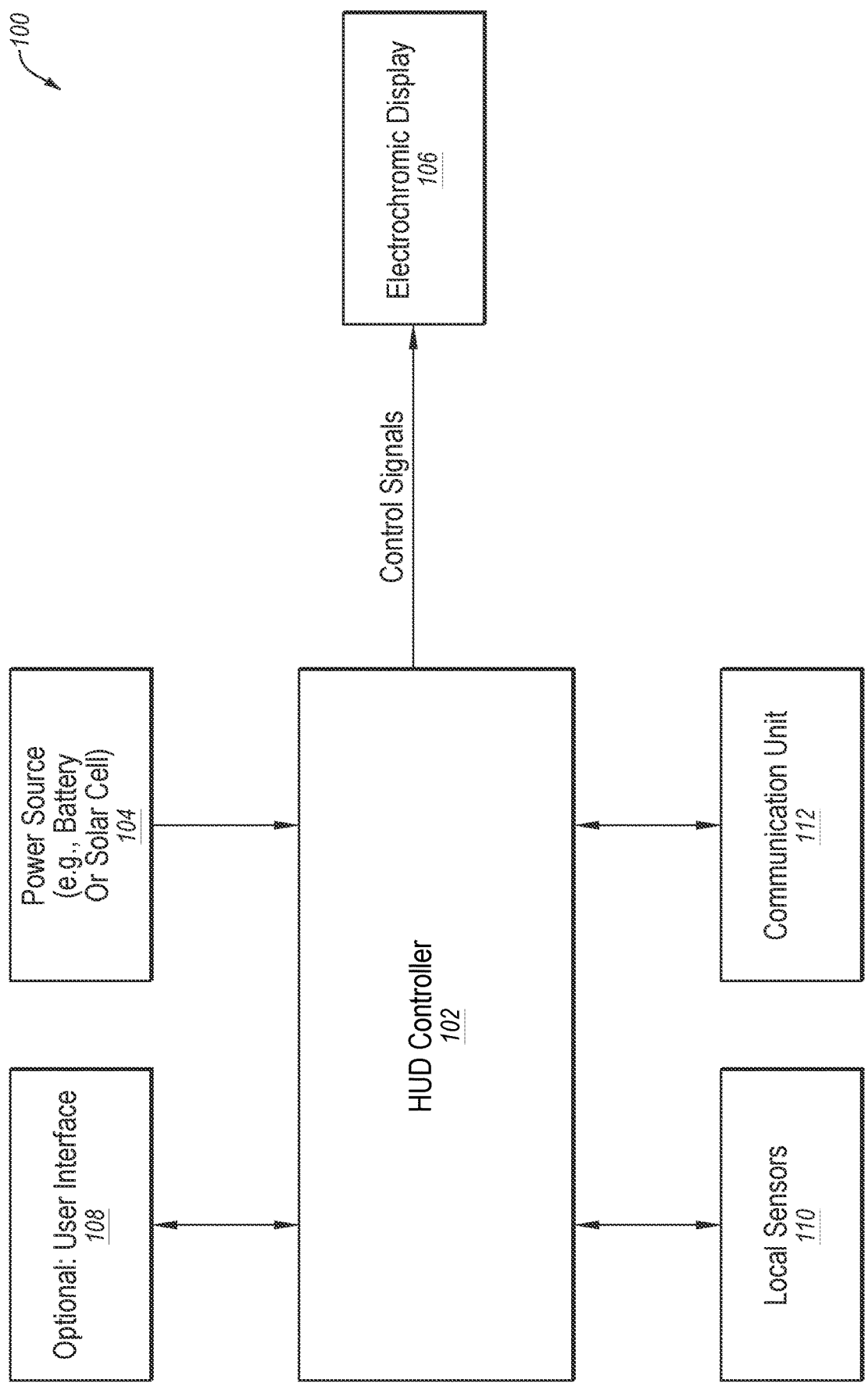
FIG. 1 illustrates a functional block diagram of an example HUD system including a HUD controller and an electrochromic display in accordance with one or more embodiments.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments enabled herein may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. In some instances similar structures or components in the various drawings may retain the same or similar numbering for the convenience of the reader; however, the similarity in numbering does not necessarily mean that the structures or components are identical in size, composition, configuration, or any other property.

Elements described herein may include multiple instances of the same element. These elements may be generically indicated by a numerical designator (e.g., 110) and specifically indicated by the numerical indicator followed by an alphabetic designator (e.g., 110A) or a numeric indicator preceded by a "dash" (e.g., 110-1). For ease of following the description, for the most part element number indicators begin with the number of the drawing on which the elements are introduced or most fully discussed. Thus, for example, element identifiers on a FIG. 1 will be mostly in the numerical format 1xx and elements on a FIG. 4 will be mostly in the numerical format 4xx.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawings could be arranged and designed in a wide variety of different configurations. Thus, the following description of various embodiments is not intended to limit the scope of the present disclosure, but is merely representative of various embodiments. While the various aspects of the embodiments may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a digital signal processor (DSP), an integrated circuit (IC), an Application Specific integrated circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

One or more embodiments of the present disclosure may include a HUD system. The HUD system may include a transparent material, an electrochromic element, and a HUD controller. The electrochromic element may be affixed to a surface of the transparent material. The HUD controller may be electrically coupled to the electrochromic element and configured to control translucence of the electrochromic element via control signals and to cause display information to be visible responsive to controlling the translucence of the electrochromic element.

One or more embodiments of the present disclosure may include a HUD controller. The HUD controller may include a microcontroller. The microcontroller may include a processing unit, a memory, and one or more peripherals. The HUD controller may be configured to be electrically coupled to an electrochromic element affixed to a transparent material. The HUD controller may further be configured generate a control signal to control translucence of the electrochromic element to display information such that the displayed information is presented in a line of sight that passes through the transparent material.

One or more embodiments of the present disclosure may include a method of displaying information in a line of sight that passes through a translucent material. The method may optionally include affixing an electrochromic element to a surface of a transparent material in a line of sight that passes through the surface of the transparent material. The method may include receiving information for display. The method may include generating a control signal for controlling a translucence of the electrochromic element to display the information. The method may also include controlling the translucence of the electrochromic element thereby displaying the information at the surface of the transparent material by: providing the control signal from a HUD controller to the electrochromic element located above a transparent surface and in a line of sight that passes through the transparent surface.

FIG. 1 illustrates a functional block diagram of an example HUD system 100 including HUD controller 102 and electrochromic display 106, in accordance with one or more embodiments. HUD controller 102 may be configured to provide control signals to electrochromic display 106. HUD controller 102 may be implemented (e.g., integrated, without limitation) in any suitable microcontroller, for example, an ATMEGA4809 commercially available from Microchip Technology Incorporated, without limitation.

Electrochromic display 106 may include multiple individual electrochromic elements. Each of the electrochromic elements may be positioned above, or affixed to, a transparent material. In the present disclosure, "above" may mean on or above. The electrochromic elements may be arranged, when activated by HUD controller 102, to provide information. As non-limiting examples, the electrochromic elements may be arranged to form one or more seven-segment displays, sixteen-segment displays, pixel-matrix displays, (e.g., a 5×7 pixel matrix display), gauge displays, binary-element displays, and combinations thereof. HUD controller 102 may be configured to send control signals to each electrochromic element of the electrochromic display to set a state of each of the various electrochromic elements and thereby enable the electrochromic display to provide information at the transparent material, e.g., display a numbers or letters by setting a state of various electrochromic elements of the seven-segment display, without limitation.

HUD system 100 may include suitable power source 104, e.g., a power source capable of powering the HUD system 100 for a suitable duration of time. As a non-limiting example, electrochromic display 106 may consume as little as 1 milliwatt (mW) per square centimeter. HUD controller 102 may consume as little as 0.74 mW. Thus, power source 104 may be able to power the HUD system 100 by providing less than 2 mW. So, as a non-limiting example, power source 104 may be a 400 mWh battery which may be capable of powering the example HUD system 100 for 200 hours.

Additionally or alternatively, power source 104 may include one or more solar cells capable of providing power generated from light. The one or more solar cells may be configured to power the HUD system 100 and/or charge a battery included in power source 104.

HUD system 100 may include user interface 108. User interface 108 may allow a user to provide inputs to HUD system 100. HUD controller 102 may be configured to interpret the inputs to control one of more functions of HUD system 100. As non-limiting examples, HUD controller 102 may interpret inputs as instructions to turn electrochromic display 106 on, or off, or to change a display mode of HUD system 100. User interface 108 may include a capacitive surface or physical buttons, without limitation.

HUD system 100 may include local sensors 110. Local sensors 110 may take readings and provide inputs indicative of the readings to HUD controller 102, and HUD controller 102 may control the electrochromic display 106 in response to the inputs. Local sensors 110 may include, as non-limiting examples, sensors such as: a thermometer, a humidity sensor, a barometer, an anemometer, an air-flow sensor, a light sensor, a microphone, a Geiger counter, an accelerometer, an altimeter, a compass, a gyroscope, a heart-rate sensor, a gas sensor, a magnetometer, a photo sensor, a distance sensor (e.g., ultrasonic), and a skin-conductance sensor.

HUD system 100 may include communication unit 112. Communication unit 112 may provide an interface for other systems to interact with HUD system 100. Any suitable communication protocol may be chosen for communication unit 112, as non-limiting examples, a BLUETOOTH® interface, a ZIGBEE® interface, Long Range (LoRa) interface, and a Narrowband Internet of Things (NB-IoT) interface. As a non-limiting example, communication unit 112 may include a BLUETOOTH® module, e.g., the RN4871 available from Microchip Technology Incorporated, without limitation. By way of non-limiting example, in a case where communication unit 112 consumes 7.4 mW to 11.1 mW, a 400 mWh battery may be capable of powering the HUD system 100 including HUD controller 102, electrochromic display 106, and communication unit 112 for up to 25 hours.

Figure 2:
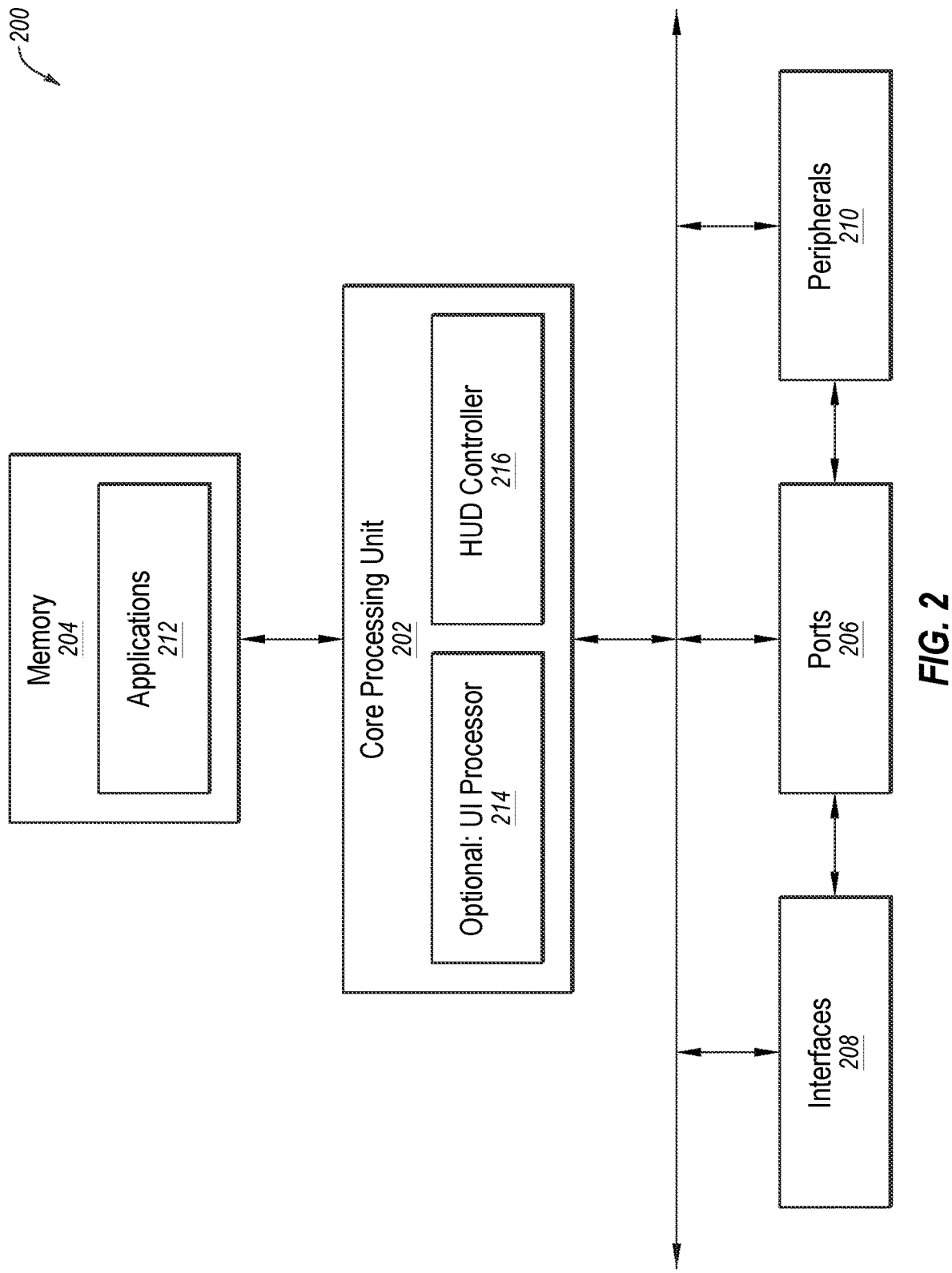
FIG. 2 illustrates functional block diagram of a microcontroller system that, in some embodiments, may be configured to implement at least some features and functions of a HUD controller of FIG. 1.

FIG. 2 illustrates a functional block diagram of a microcontroller system 200 that, in some embodiments, may be configured to implement at least some features and functions of HUD controller 102 of FIG. 1. Microcontroller system 200 may include core processing unit 202, memory 204, ports 206, interfaces 208, and peripherals 210, without limitation.

In some embodiments, core processing unit 202 may include one or more central processing units (CPUs) configured to execute computing instructions. Examples of central processing units are given below with regard to processor 902 of FIG. 9. When executing computing instructions, the one or more CPUs may be understood to be special/specific purpose processing units, for example, when executing instructions of one or more applications 212 stored at memory 204, the one or more CPUs may be understood to be HUD controller 216 and/or optional user interface (UI) processor 214. In some embodiments, core processing unit 202 may include logic circuitry (e.g., logic gates, without limitation) for implementing HUD controller 216 and/or optional UI processor 214.

In some embodiments, microcontroller system 200 may include a single core processing unit 202 configured to execute instructions causing the single core processing unit 202 to function as HUD controller 216 and/or optional UI processor 214. A single core processing unit 202 may allow for lower power consumption, more customizability, and/or simplified or reduced levels of communication—as compared with a microcontroller system 200 including two core processing units 202, where one core processing unit 202 functions as optional UI processor 214 and one core processing unit 202 functions as HUD controller 216.

Memory 204 may be any suitable form of, or combination of, volatile and non-volatile computer memory (examples of memory are given below with regard to storage 904 of FIG. 9) configured to store computing instructions and be used in the execution of the computing instructions. For example, and as discussed above, memory 204 may store computing instructions comprising applications 212. Applications 212 may include instructions that cause a processor of core processing unit 202 to perform one or more operations. As non-limiting examples, applications 212 may include instructions for such things performing capacitive sensing and touch processing (e.g., by optional UI processor 214, without limitation) and displaying information at an electrochromic display (e.g., by HUD controller 216, without limitation). As a non-limiting example, optional UI processor 214 may govern how microcontroller system 200 responds to a user input, e.g., through user interface 108. As another non-limiting example, HUD controller 216 may govern overall operation of microcontroller system 200.

Interfaces 208 may include various interfaces, and more specifically, logic circuitry, configured to implement protocols for serial and/or parallel communication (e.g., sending and/or receiving information via analog and/or digital signals, without limitation). Interfaces 208 may provide for internal communications within elements of core processing unit 202 and/or external communications between core processing unit 202 and other elements of a system (e.g., HUD system 100). Non-limiting examples of protocols included in interfaces 208 include: inter-integrated circuit (I²C), Modbus, Control Area Network (CAN bus), Universal Asynchronous Receiver-Transmitter (UART), Universal Synchronous and Asynchronous Receiver Transmitter (USART), Serial Peripheral Interface, (SPI), Recommended Standard 232 (RS-232), and Recommended Standard 485 (RS-485).

Ports 206 may include, as non-limiting examples, input/output pins for physical connections between core processing unit 202 and one or more other devices, including, without limitation, an electrochromic display.

Peripherals 210 may be configured to provide for one or more functionalities of embodiments of microcontroller system 200. As non-limiting examples, peripherals 210 may include general purpose input and output (GPIO) controllers, timers, pulse-width modulation (PWM) controllers, Digital-to-Analog Converters (DACs), Analog-to-Digital Converters (ADCs), serial communication controllers, interrupt controllers, Peripheral Touch Controllers (PTCs), Custom Configurable Logic (CCL), and Operational Amplifiers (OPAMPs). Notably, in the embodiment of FIG. 2, HUD controller 216 is depicted as implemented by core processing unit 202, however, it is also contemplated that, in some embodiments, HUD controller 216 may be implemented by peripheral 210.

Figure 3:
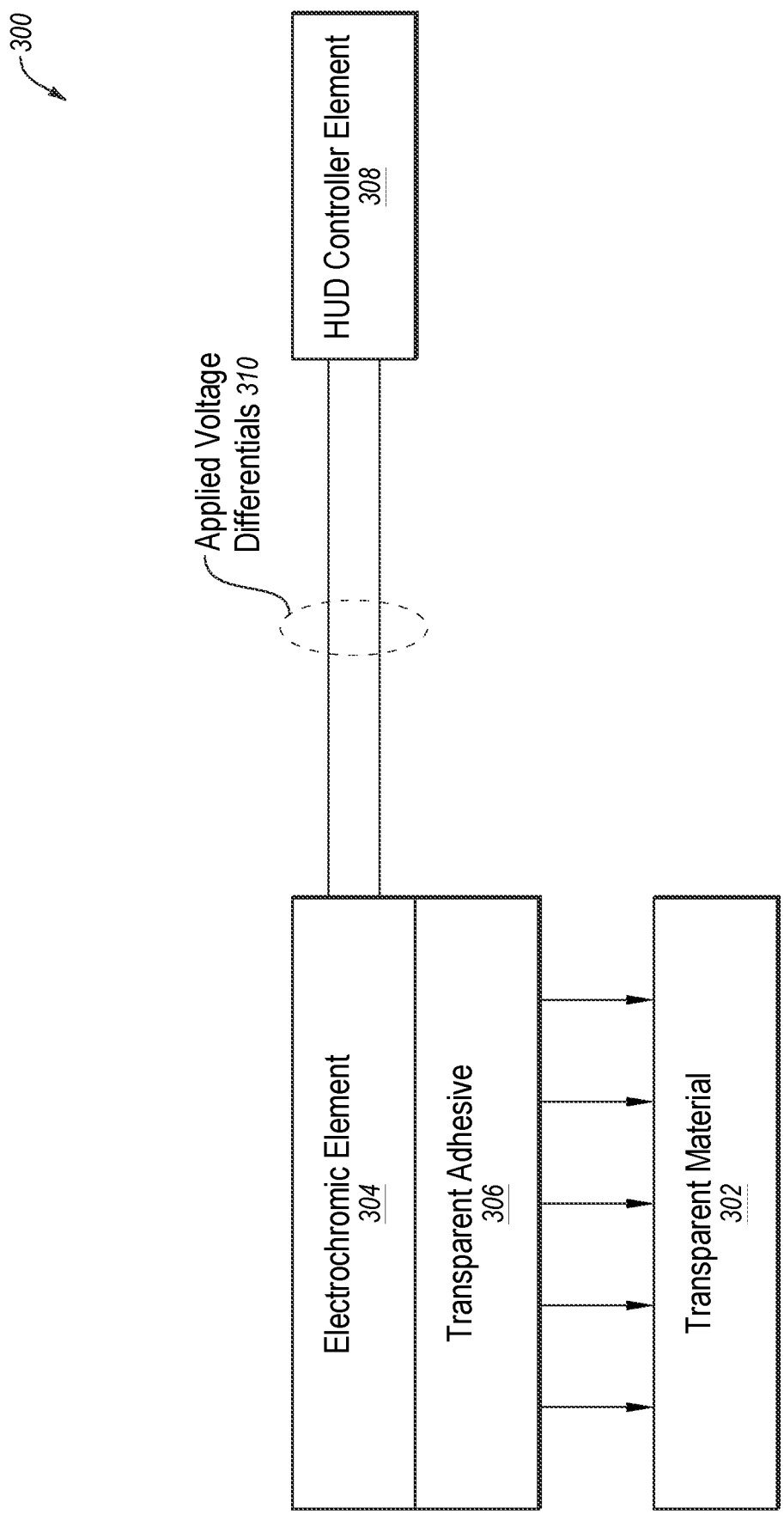
FIG. 3 illustrates a functional block diagram of an electrochromic display in accordance with one or more embodiments.

FIG. 3 illustrates a schematic diagram of an electrochromic-display portion 300, in accordance with one or more embodiments. Electrochromic-display portion 300 includes an electrochromic element 304 affixed to a surface of transparent material 302 by transparent adhesive 306, and operatively coupled to HUD controller element 308. Electrochromic element 304 may include an individual electrochromic element that may be activated and deactivated to change its translucence. The term "translucence" may describe how light passes through or does not pass through an object. The term "translucence" may include degrees of translucence, e.g., from totally transparent to totally opaque. Further, the term "translucence" may be wavelength dependent, i.e., the object may allow certain wavelengths to pass through while blocking others which may change a perceived color of the object. Additionally, the term "transparent" may refer to an object permitting more light to pass through the object than is blocked by the object. Additionally, the term "opaque" may refer to an object blocking more light than is allowed to pass through the object.

In some embodiments, electrochromic display 106 of FIG. 1, may include a number of electrochromic elements 304 arranged, for example, on a continuous extension of transparent material 302 such that, when controlled together, they appear to form alpha-numeric characters, shapes, and pictures, without limitation. In some embodiments, HUD controller element 308 may be implemented by HUD controller 216 of microcontroller system 200 (e.g., HUD controller 216 may include a number of HUD controller elements 308, each for controlling a respective electrochromic element 304 of electrochromic display 106). For example, electrochromic element 304 may be operatively coupled to HUD controller element 308 via one or more of ports 206.

Electrochromic element 304 may be activated by an applied voltage differential 310. HUD controller element 308 may be configured to supply the applied voltage differential 310 to activate electrochromic element 304. In the present disclosure, the applied voltage differential 310 may also be referred to as a control signal. In certain embodiments, electrochromic element 304, when set to a particular translucence by a certain applied voltage differential 310, may maintain that particular translucence after removal of the applied voltage differential 310 for a certain amount of time. Thus, the term "activate" means setting the electrochromic element 304, or one or more elements thereof, to a particular translucence. Advantageously, electrochromic element 304 is set to a particular translucence by a pulse of applied voltage differential 310, whose pulse time is relatively short as compared to the amount of time for which the particular translucence is maintained after application.

Transparent adhesive 306 (e.g., an adhesive material or adhesive layer, without limitation) is arranged for affixing a surface of electrochromic element 304 to a surface of transparent material 302. While FIG. 3 illustrates electrochromic element 304 above transparent material 302, other longitudinal and lateral adjacencies are contemplated including without limitation under transparent material 302 and co-planar and adjacent to transparent material 302. In particular, electrochromic element 304 may be applied to either an inner or an outer surface of transparent material 302, or applied between layers of transparent material 302, such as during a manufacturing process, without exceeding the scope.

Transparent material 302 may be, or may include a portion of, but is not limited to, a window pane, including interior and exterior windows of a building, and doors of a building, a window of a vehicle, including: an automobile windshield, an aircraft windshield, a water-craft windshield, and other windows (e.g., side and rear windows) of a vehicle, a transparent surface of a wearable including: an eyeglass lens, an eye-wear visor, goggles, a visor of a mask or helmet, or a glass or resin material overlaying another surface, including, e.g., a mirror or a display (e.g., a display of a smartphone, a tablet, a television, or a wearable device, without limitation). The existing transparent surface need not be wholly transparent, it may alternatively be translucent or have a degree or translucency.

Figure 4:
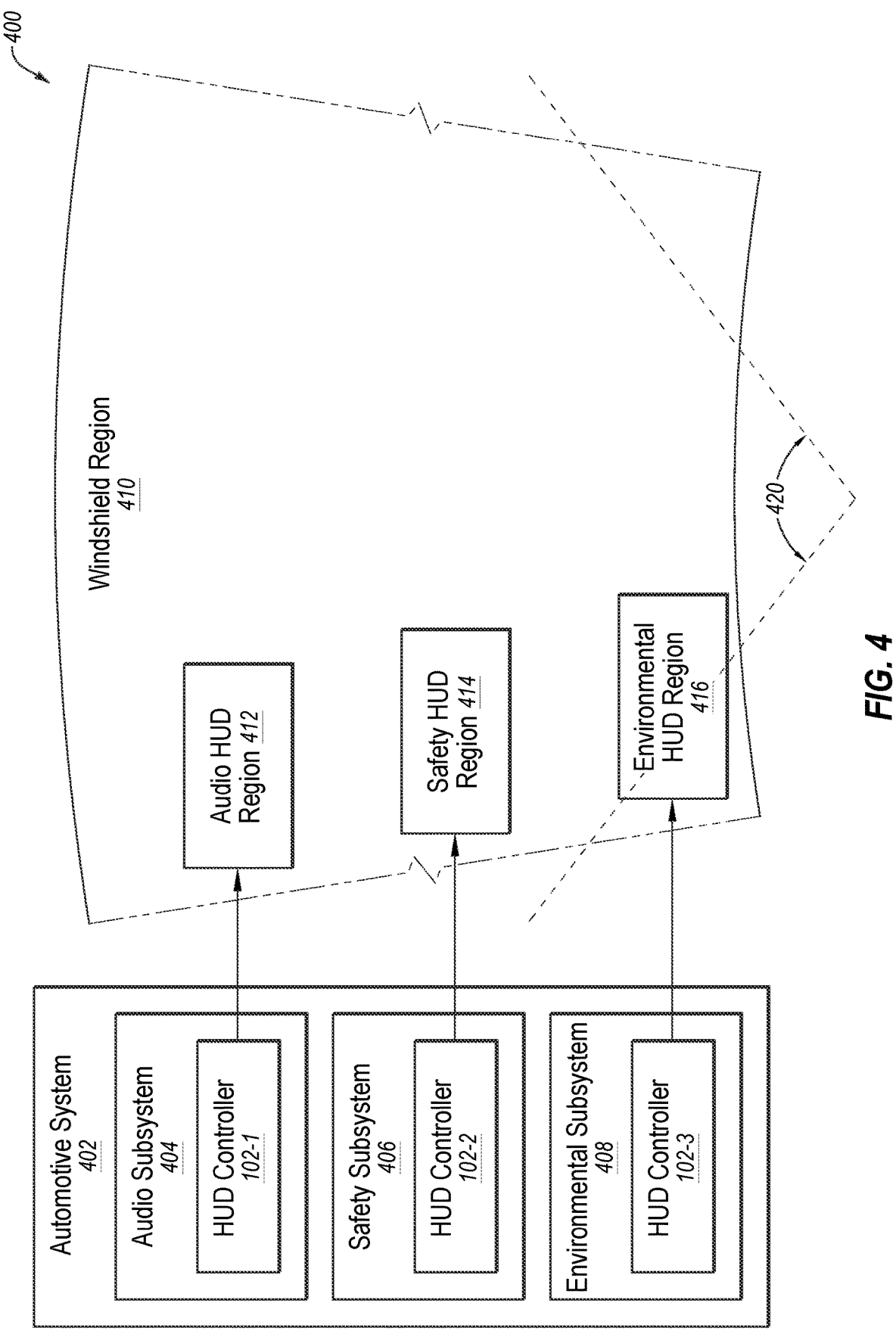
FIG. 4 illustrates one example of an environment in which embodiments of the present disclosure may be used.

FIG. 4 illustrates an example environment 400 in which a HUD system (e.g., HUD system 100, without limitation) may be deployed, in accordance with one or more embodiments. FIG. 4 illustrates windshield 410. In the specific example depicted by FIG. 4 windshield 410 is an automobile windshield, however, the disclosure encompasses other windshields, e.g., windshields for aircraft, space craft, or water craft, without limitation. Windshield 410 includes several display regions, including HUD regions 412, 414, and 416. Respective HUD regions 412, 414, and 416 may each include an electrochromic display (e.g., electrochromic display 106 of FIG. 1, which may include one or more electrochromic elements, e.g., electrochromic element 304 of FIG. 3, without limitation) affixed to windshield 410 (e.g., by a transparent adhesive, e.g., transparent adhesive 306 of FIG. 3). Each of the electrochromic displays may be controlled by a HUD controller (e.g., HUD controller 102 of FIG. 1, which may include microcontroller system 200 of FIG. 2 which may be configured as HUD controller 216). The HUD regions: audio HUD region 412, safety HUD region 414, and environmental HUD region 416, may be configured to be within a line of sight 420, e.g., of a viewer. The HUD regions 412, 414, and 416 may thus be controlled to cause display of information to a viewer by making patterns of electrochromic elements within the HUD regions 412, 414, and 416 visible. Respective HUD regions 412, 414, and 416 may be affixed to an inner surface of windshield 410 to prevent damage, to an outer surface of windshield 410 and optionally covered by an additional transparent layer, or applied between layers of windshield 410, without exceeding the scope.

Automotive system 402 may include one or more systems and/or subsystems of an automobile that incorporate, as a feature or function, an informational display. Automotive system 402 may include, as non-limiting examples, audio subsystem 404, safety subsystem 406, and environmental subsystem 408. Additional non-limiting examples of subsystems that may be included in automotive system 402, and that may be configured to display information on a HUD region may include: an electrical subsystem, a climate-control subsystem, a passenger subsystem, a fuel subsystem, an engine subsystem, a braking subsystem, a passenger subsystem, a chassis subsystem, an entertainment subsystem, and a security subsystem.

Each subsystem of automotive system 402 may include a respective HUD controller 102-1, 102-2, 102-3 (e.g., HUD controllers, which may also be referred to herein as HUD controllers 102) for displaying information to a user of an automobile, e.g., on windshield 410, without limitation. For example, audio subsystem 404 may include HUD controller 102-1 configured to control audio HUD region 412. Audio subsystem 404 may instruct HUD controller 102-1 to display audio information at audio HUD region 412. Similarly, safety subsystem 406 may instruct HUD controller 102-2 to display safety information at safety HUD region 414. Also, similarly, environmental subsystem 408 may instruct HUD controller 102-3 to display environmental information at environmental HUD region 416. Alternatively, in an embodiment that is not illustrated, automotive system 402 may include a single HUD controller 102 that may control one or more HUD regions and may receive information from one or more of the various subsystems. In one embodiment, all but a first one of HUD regions 412, 414, and 416 and, if implemented, the respective HUD controller 102-1, 102-2, 102-3 are considered additional HUD controllers and respective HUD regions.

Although various HUD controllers 102 are illustrated as each connected to one HUD region, in some embodiments, HUD controllers 102 may be configured to be connected to two or more HUD regions and/or a single HUD region may be configured to be connected to two or more HUD controllers 102. Additionally, the connections between HUD controllers 102 and the HUD regions may be configurable. For example, at a first time, audio HUD region 412 may display information of audio subsystem 404. At a later time, e.g., according to a user-selectable configuration, or based on an instruction of automotive system 402, audio HUD region 412 may be configured to display information from safety subsystem 406. For example, there may be multi-plexer between the various subsystems and the display regions.

Non-limiting examples of information that may be displayed on the HUD regions of windshield 410 include: speed information, directional information (e.g., a direction of travel), navigation information (e.g., driving directions), distance information (e.g., a distance between a vehicle and an object in front of, behind, or to the side of the vehicle, e.g., in the vehicle's blind spot), engine information including, e.g.: revolutions per minute of the engine, engine-temperature information, engine-oil life, and engine-performance information, transmission information (e.g., which gear a car is in), environmental information including, e.g.: ambient temperature and wind information, passenger information including: in-vehicle temperature; seatbelt information; and airbag information, tire-pressure information, warnings, alerts, maintenance information, operational-systems operation (e.g., information regarding operation of systems of the vehicle, e.g., whether traction control, four-wheel-drive and headlights are operational or active), audio-system information including: audio source; audio volume; balance information; and fade information, and security information.

Additionally, automotive system 402 may be configured to receive information from another device to display on one or more of the HUD regions. For example, automotive system 402, or one of its subsystems, may include a communication unit that may be configured to communicate with an electronic device (e.g., a smartphone, a tablet, a game system, or an audio player, without limitation). Automotive system 402 (or an appropriate subsystem thereof) may be configured to display information relative to the other device. As non-limiting examples, automotive system 402 (or the appropriate subsystem thereof) may be configured to display, in a respective HUD region, information including: notifications from applications running on the device, status of the device including battery life, strength of signals received by the device (e.g., from a cellular network), and tasks being performed by the device, information from applications running on the device (e.g., navigational instructions from an application, weather information from an application, and meta-data regarding audio of the device that may be reproduced on the vehicles sound system) and/or information regarding sensor data from the other device (e.g., positional information, acceleration information, and temperature information).

Figure 5:
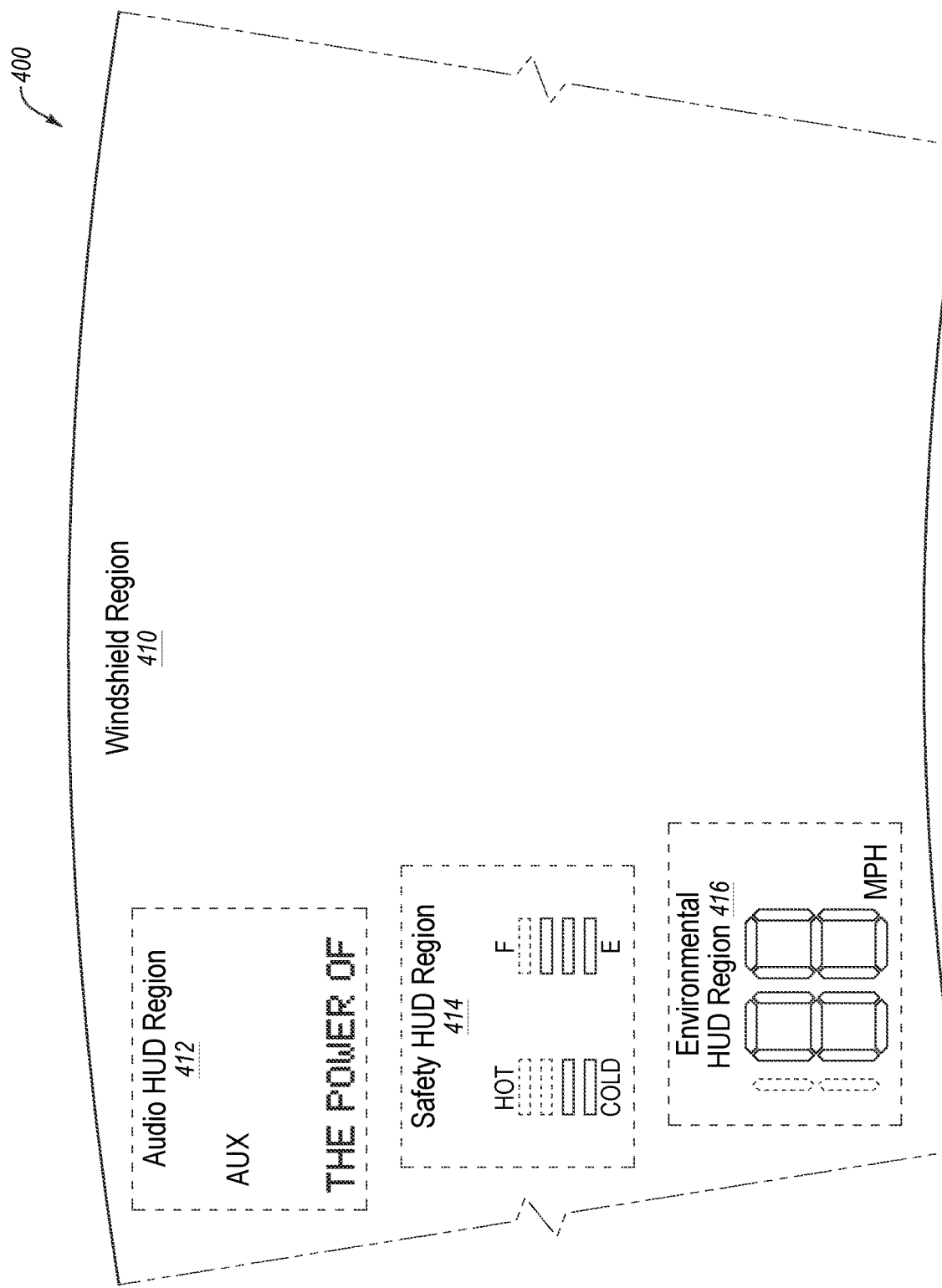
FIG. 5 illustrates a specific non-limiting example of information displayed at various HUD regions in the example environment of FIG. 4.

FIG. 5 illustrates a specific non-limiting example of information displayed at various HUD regions 412, 414, and 416 during contemplated operations of the system depicted in example environment 400. The example HUD regions of FIG. 5 include various display elements as examples. For example, audio HUD region 412 includes a binary display element for displaying "AUX," e.g., an audio input source. As an example a binary display element may be configured to display information by being either "in an opaque state" or "in a transparent state." Thus, the "AUX" display element may be configured to display whether the audio source is auxiliary by being set to an opaque state, or not auxiliary by being set to a transparent state. The various HUD regions 412, 414, and 416 may include additional binary display elements that are not opaque in the example of FIG. 5 and thus not illustrated. For example, audio HUD region 412 may include a BLUETOOTH® icon an "AM" and/or an "FM" to indicate alternative audio input sources. Additionally, audio HUD region 412 also includes a number of pixel-matrix displays. Safety HUD region 414 includes two gauge displays for displaying information regarding relative temperature and information regarding the amount of fuel in a fuel tank of the vehicle. In some embodiments, the gauge displays may include colored electrochromic elements that are configured to block only certain wavelengths of light. As a non-limiting example, lower elements on a temperature gauge display may pass only blue light and appear blue while higher elements may pass only red light and appear red. Environmental HUD region 416 includes two seven-segment displays for displaying numbers and two binary display elements for displaying either "MPH" or "KPH." Additionally illustrated in environmental HUD region 416 are two hexagonal binary display elements configured to display a number "1" when activated. The two hexagonal display elements are illustrated using dashed lines to illustrate that the elements are set to the transparent state. For illustrative purposes, the seven elements of each of the seven segment displays are set to the opaque state while the two hexagonal elements are set to the transparent state.

Figure 6:
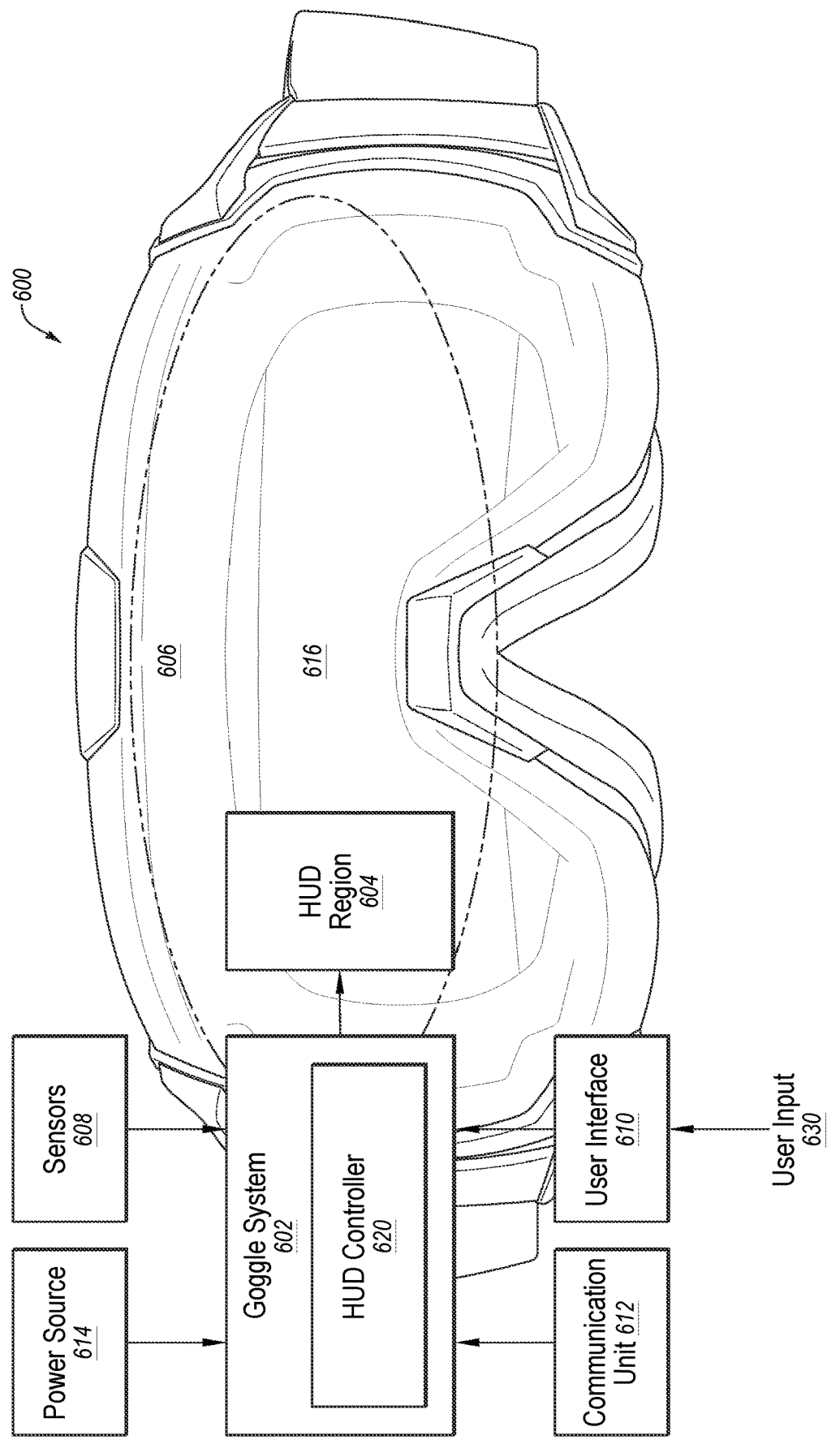
FIG. 6 illustrates another example of an environment in which embodiments of the present disclosure may be used.

FIG. 6 illustrates another example of an environment in which embodiments of the present disclosure may be used.

FIG. 6 illustrates lens 606. Lens 606 may be for goggles 600 (which may be as non-limiting examples, sport goggles, e.g., sky-diving goggles, ski goggles, underwater goggles, or part of a visor of a helmet, e.g., a motorcycle helmet), and thus may be an embodiment of a wearable. Lens 606 includes a HUD region 604. HUD region 604 may include an electrochromic display (e.g., electrochromic display 106 of FIG. 1, without limitation) affixed to an inner, or an outer surface of lens 606. In certain applications, HUD region 604 may be affixed between layers of lens 606. The electrochromic display may be controlled by HUD controller 620 (e.g., HUD controller 102 of FIG. 1, which may include microcontroller system 200 of FIG. 2). The HUD region 604 may be configured to be within a line of sight 616, e.g., of a viewer. The HUD region 604 may thus be configured to display information to the viewer by making electrochromic elements within the HUD region 604 visible, i.e., opaque.

Goggles 600 may include goggle system 602. Goggle system 602 may be an example of, or include, HUD system 100 of FIG. 1. Goggle system 602 may include HUD controller 620. Goggle system 602 may receive inputs from one or more sensors 608 and user interface 610. Additionally or alternatively, goggle system 602 may communicate with one or more other electronic devices through communication unit 612. Additionally, goggle system 602 may include power source 614.

As an example of contemplated operations of goggles 600, goggle system 602 may receive a user input 630 through user interface 610 (a first user input). The user input 630 may be interpreted by goggle system 602 as an instruction to begin displaying information in HUD region 604. Goggle system 602 may provide a first type of information and/or first data to HUD controller 620. HUD controller 620 may send appropriate control signals (e.g., voltage differentials) to the electrochromic elements in HUD region 604 to display the information. For example, HUD region 604 may display temperature information. In some embodiments, the temperature information may be provided by sensors 608 (for example, sensors 608 may include a thermometer).

Then, user interface 610 may provide another user input 630 (a second user input). Goggle system 602 may interpret the user input 630 as an instruction to display a second type of information in HUD region 604. Goggle system 602 may provide the second type of information and/or second data to HUD controller 620. HUD controller 620 may send appropriate voltage signals to the electrochromic elements in HUD region 604 to display the second type of information. For example, HUD region 604 may display direction information, e.g., informing a user of the cardinal direction that goggles 600 are facing. In some embodiments, the direction information may be provided by sensors 608, which may include a compass or a global satellite positioning system having a compass feature.

Non-limiting examples of information that may be displayed by goggles 600 (e.g., at HUD region 604 or another suitable HUD region and controlled by HUD controller 620 or another suitable HUD controller 102) that may be based on readings from sensors 608, include: altitude information, barometric pressure information, underwater-depth information (e.g., in the case that the goggles are underwater goggles), ambient temperature information, skin temperature information, heart-beat information, distance information (e.g., based on a laser-range finder), direction information (e.g., in which direction the googles are facing) and speed information (e.g., based on measured air speed or accelerometers).

Additionally, goggles 600 may be configured to display information from, or based on data from, another source, e.g., a source providing information to goggle system 602 via communication unit 612. The information from the other source may include any of the example information describe above with regard to the information displayed on windshield 410 of FIG. 4. Additionally, the information from another source may include any of the example information described above with regard to information derived from sensors 608. Additionally, non-limiting examples of information that may be displayed by goggles 600 that may be from, or based on data from, another source, include: position information (e.g., from a navigation application running on the other source), time information, and forecasted weather information including weather alerts.

Additionally, in some embodiments, goggles 600 may generate information to display at HUD region 604. Non-limiting examples of information generated by goggles 600 include: time information, including the time since an event (e.g., a button press (e.g., goggles 600 may perform a function related to a stopwatch)) and battery information relative to power source 614 of goggles 600.

Figure 7:
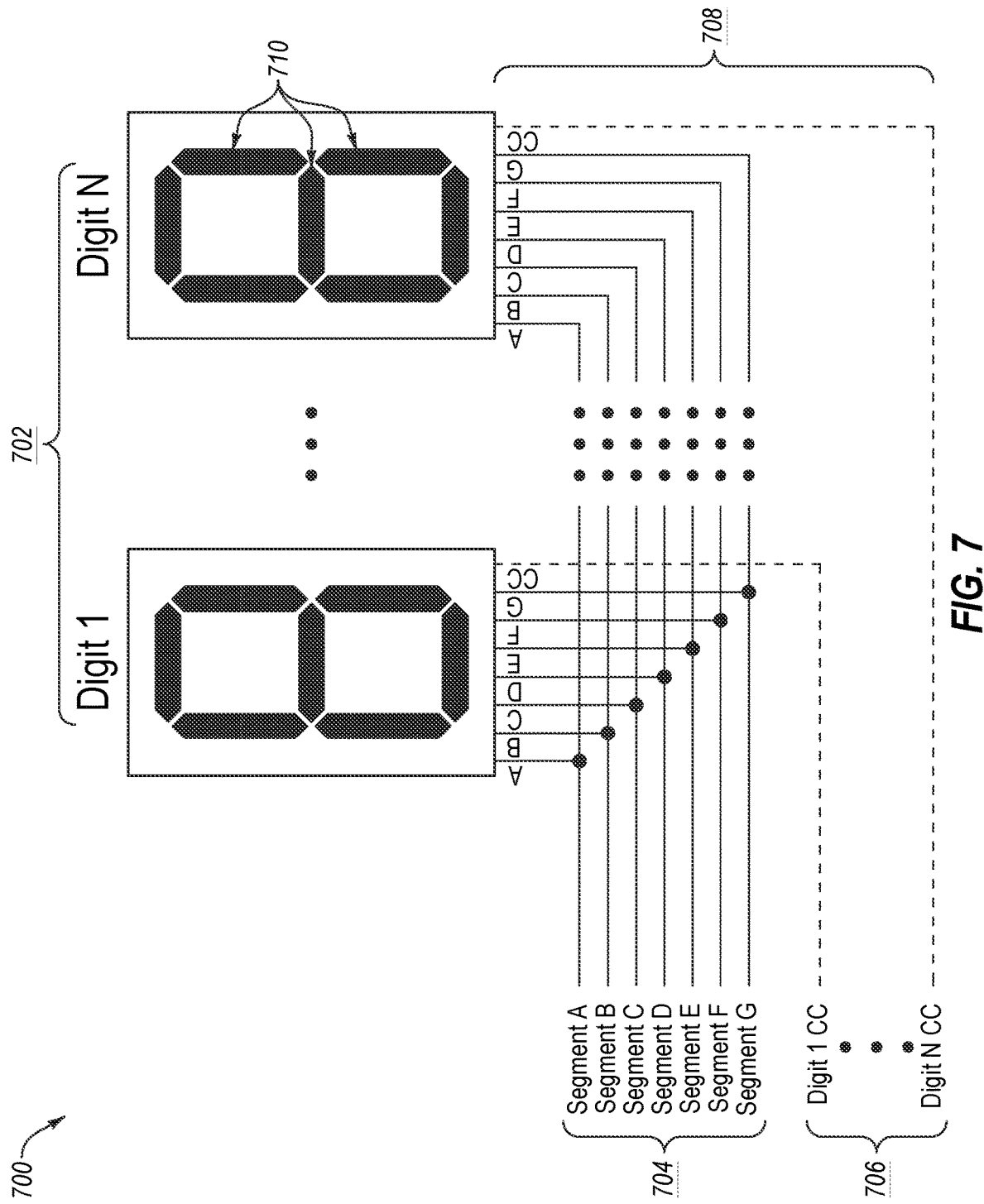
FIG. 7 illustrates display elements that may be used as part of a HUD system according to one or more embodiments.

FIG. 7 illustrates seven-segment displays that may be used as part of a display system 700 according to one or more embodiments. In particular, FIG. 7 illustrates two seven-segment displays—digits 702. The digits 702 include individual display elements—segments 710. FIG. 7 also illustrates electrical-connection lines 704 that may be configured to provide control signals to like segments 710 of each of the digits 702. The electrical-connection lines 706 may include control lines 708 for each of the digits 702 of the seven-segment displays. The electrical-connection lines 704 include one line for each of the segments 710 and are connected in parallel to like segments 710 of each of the digits 702. For example, the Segment A segment input line may provide a control signal for all of the Segments A of all of the digits 702 and the Digit 1 CC input line may provide a control signal for all of the segments 710 of Digit 1.

In some embodiments, a display controller may be operatively coupled to electrochromic elements of an electrochromic display directly or via one or more multiplexers. Control signals provided by a display controller (e.g., the HUD controller 102 of FIG. 1) to various electrochromic elements of an electrochromic display (e.g., the electrochromic display 106 of FIG. 1) may be routed by the multiplexer.

Electrochromic elements of an example electrochromic display may turn 'on' (become opaque) when provided with a positive voltage differential and turn 'off' (become transparent) when provided with a negative voltage differential.

In some cases, electrochromic elements may hold an 'on' state for a duration of time. In these cases, the element may remain 'on' even if a voltage differential is close to zero Volts. Thus, it may be possible to turn elements off by setting a 'common' (CC) pin to 5 Volts and an 'input' (Segment) pin to 0 volts.

Figure 8:
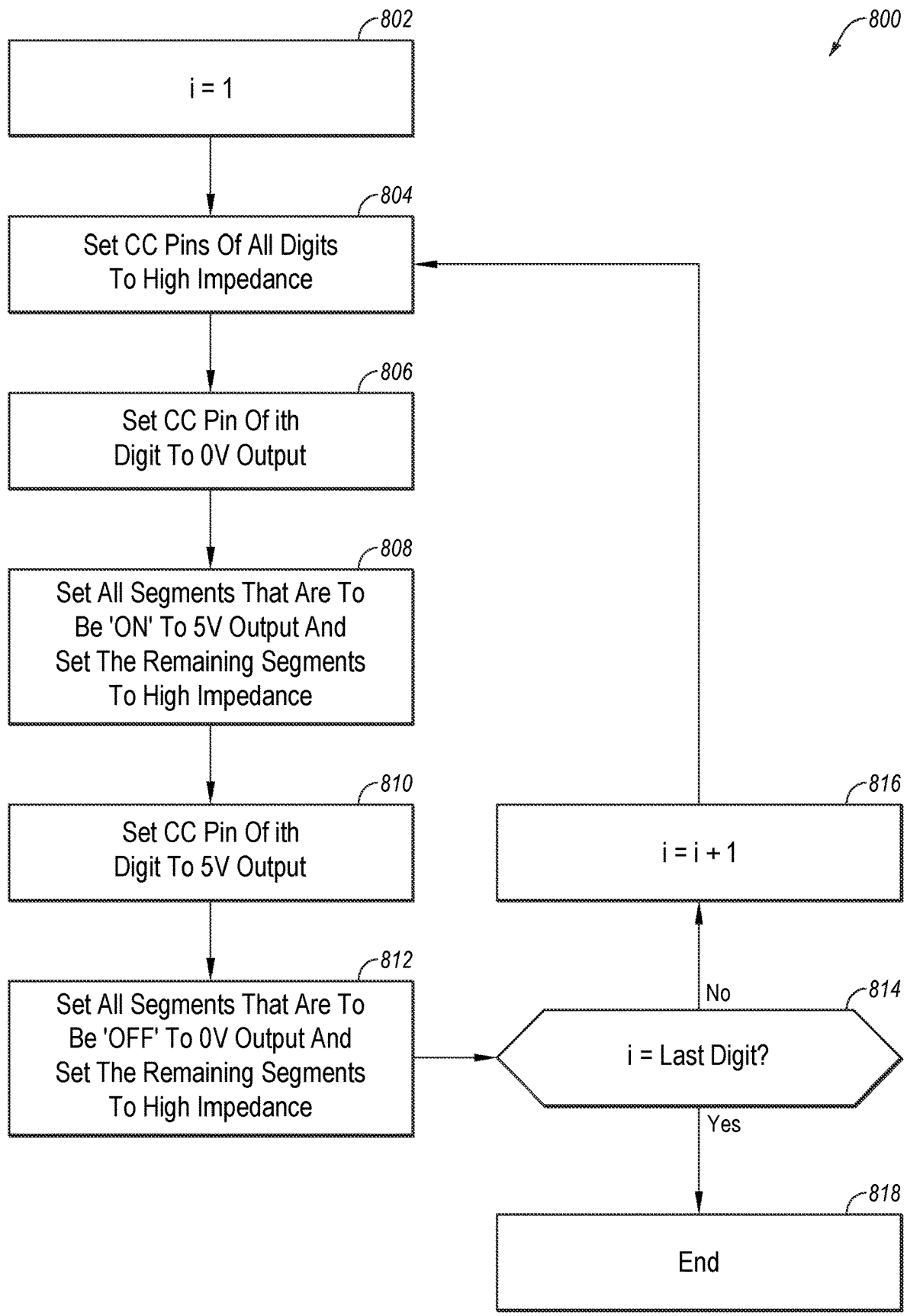
FIG. 8 illustrates a flowchart of an example process for refreshing a display according to one or more embodiments.

In these or other cases, it may be possible to refresh a display as illustrated in FIG. 8 and described with regard to process 800. At least some of the operations of FIG. 800 may be controlled and/or performed, wholly or in part, by microcontroller system 200 of FIG. 2, which may be implementing HUD controller 216.

Process 800 may be include refreshing the display. Refreshing the display may include providing a control signal to one or more elements of the display. In some embodiments, refreshing may include providing an updated or changed control signal to elements based on a desired change to the state of the elements. In other embodiments, refreshing the display may include providing a control signal to each element regardless of whether the signal is changed from a prior signal or not.

Process 800 may include block 802 at which a counter (i) may be set to 1. At block 804, all CC pins of all of the digits (e.g., Digits 1-N of FIG. 7) may be set to high impedance. At block 806 a CC pin of an ith Digit may be set to zero volts. At block 808, all Segments of the ith Digit that are to be 'on' may be set to five Volts and the Segments of the ith Digit that are to be 'off' (e.g., the remaining Segments) may be set to high impedance. At block 810, the CC pin of the ith Digit may be set to five Volts. At block 812, all Segments of the ith Digit that are to be 'off' may be set to zero Volts and the Segments of the first Digit that are to be 'on' (e.g., the remaining Segments) may be set to high impedance. At decision block 814 it may be determined if i is equal to the last Digit (N), or, if all the Digits have been refreshed. If all the Digits have not been refreshed, at block 816, i may be incremented. Following the incrementing of i, the process may be repeated starting from block 804. If all the Digits have been refreshed, process 800 may end at block 818.

In some embodiments, process 800 may be repeated at regular time intervals. For example, at regular intervals, (e.g., once per minute), process 800 may be repeated. This may cause the various electrochromic elements to retain their charge and thus opacity. In some embodiments, process 800 may be repeated for all elements at the regular intervals. In other embodiments, process 800 may be repeated for elements that have not been updated since the prior regular repetition of process 800.

This is just one conceived method of multiplexing data from a display controller to an electrochromic display that may allow a display controller to control more electrochromic elements than the display controller has output pins. Process 800 may be implemented to control display elements having any configuration, e.g., a pixel matrix of display elements, or a gauge of display elements.

Figure 9:
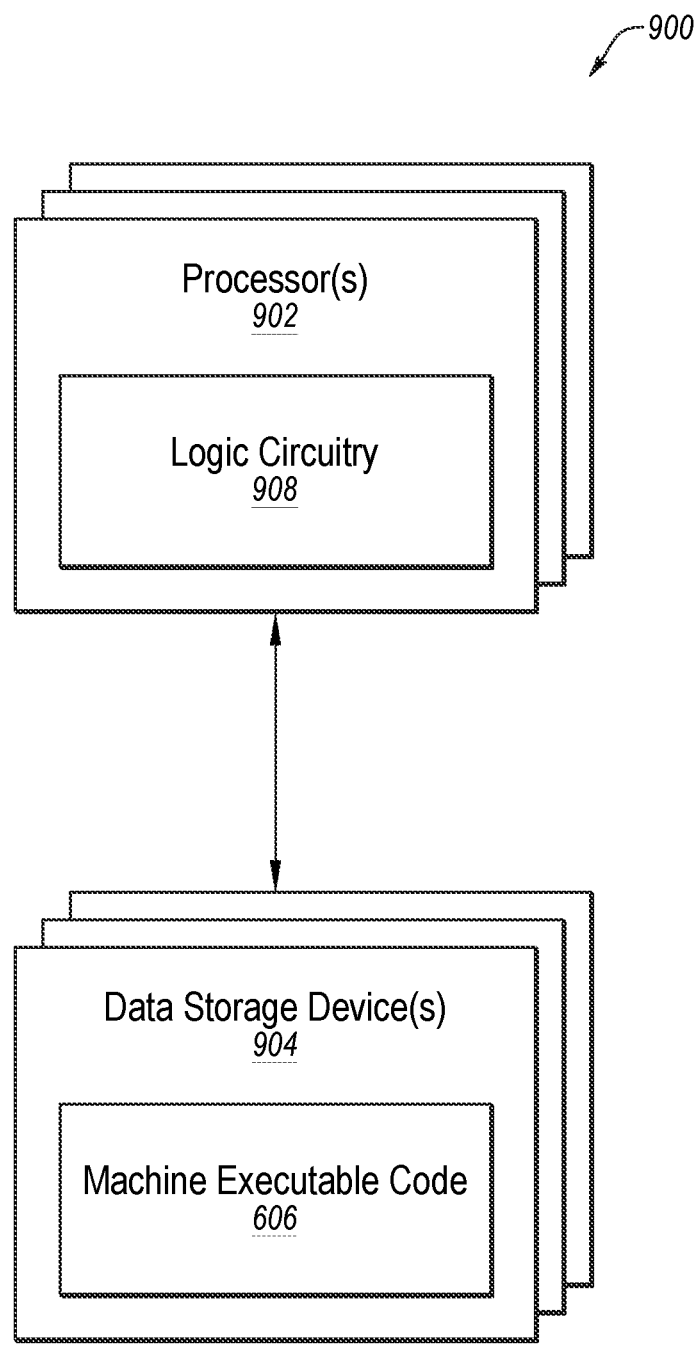
FIG. 9 is a block diagram that illustrates circuitry that may be used to implement one or more embodiments.

FIG. 9 is a block diagram of circuitry 900 that, in some embodiments, may be used to implement various functions, operations, acts, processes, and/or methods disclosed herein. Circuitry 900 includes one or more processors 902 (sometimes referred to herein as "processors 902") operably coupled to one or more apparatuses such as data storage devices (sometimes referred to herein as "storage 904"), without limitation. Storage 904 includes machine executable code 906 stored thereon (e.g., stored on a computer-readable memory) and processors 902 include logic circuitry 908. Machine executable code 906 include information describing functional elements that may be implemented by (e.g., performed by) logic circuitry 908. Logic circuitry 908 is adapted to implement (e.g., perform) the functional elements described by machine executable code 906. Circuitry 900, when executing the functional elements described by machine executable code 906, should be considered as special purpose hardware configured for carrying out functional elements disclosed herein. In some embodiments processors 902 may be configured to perform the functional elements described by machine executable code 906 sequentially, concurrently (e.g., on one or more different hardware platforms), or in one or more parallel process streams.

When implemented by logic circuitry 908 of processors 902, machine executable code 906 is configured to adapt processors 902 to perform operations of embodiments disclosed herein. For example, machine executable code 906 may be configured to adapt processors 902 to perform at least a portion or a totality of the operations associated with HUD controller 102 of FIG. 1, optional UI processor 214 of FIG. 2, HUD controller 216 of FIG. 2 and/or process 800 of FIG. 8.

Processors 902 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute computing instructions (e.g., software code) related to embodiments of the present disclosure. It is noted that a general-purpose processor (may also be referred to herein as a host processor or simply a host) may be a microprocessor, but in the alternative, processors 902 may include any conventional processor, controller, microcontroller, or state machine. Processors 902 may also be implemented as a combination of computing devices, such as a combination of a DSP and a microprocessor, a plurality of microprocessors, one or more microprocessors in conjunction with a DSP core, or any other such configuration.

In some embodiments storage 904 includes volatile data storage (e.g., random-access memory (RAM)), non-volatile data storage (e.g., Flash memory, a hard disc drive, a solid state drive, erasable programmable read-only memory (EPROM), etc.). In some embodiments, processors 902 and storage 904 may be implemented into a single device (e.g., a semiconductor device product, a system on chip (SOC), etc.). In some embodiments, processors 902 and storage 904 may be implemented into separate devices.

In some embodiments machine executable code 906 may include computer-readable instructions (e.g., software code, firmware code). By way of non-limiting example, the computer-readable instructions may be stored by storage 904, accessed directly by processors 902, and executed by processors 902 using at least logic circuitry 908. Also by way of non-limiting example, the computer-readable instructions may be stored on storage 904, transmitted to a memory device (not shown) for execution, and executed by processors 902 using at least logic circuitry 908. Accordingly, in some embodiments logic circuitry 908 includes electrically configurable logic circuitry 908.

In some embodiments machine executable code 906 may describe hardware (e.g., circuitry) to be implemented in logic circuitry 908 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used, without limitation. By way of non-limiting examples, VERILOG™, SYSTEMVERILOG™, or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of logic circuitry 908 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments machine executable code 906 may include an HDL, an RTL, a GL description, a mask level description, other hardware description, or any combination thereof.

In embodiments where machine executable code 906 includes a hardware description (at any level of abstraction), a system (not shown, but including storage 904) may be configured to implement the hardware description described by machine executable code 906. By way of non-limiting example, processors 902 may include a programmable logic device (e.g., an FPGA or a PLC) and logic circuitry 908 may be electrically controlled to implement circuitry corresponding to the hardware description into logic circuitry 908. Also by way of non-limiting example, logic circuitry 908 may include hard-wired logic manufactured by a manufacturing system (not shown, but including storage 904) according to the hardware description of machine executable code 906.

Regardless of whether machine executable code 906 includes computer-readable instructions or a hardware description, logic circuitry 908 is adapted to perform the functional elements described by machine executable code 906 when implementing the functional elements of machine executable code 906. It is noted that although a hardware description may not directly describe functional elements, a hardware description indirectly describes functional elements that the hardware elements described by the hardware description are capable of performing.

Any characterization in this disclosure of something as "typical," "conventional," or "known" does not necessarily mean that it is disclosed in the prior art or that the discussed aspects are appreciated in the prior art. Nor does it necessarily mean that, in the relevant field, it is widely known, well-understood, or routinely used.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

As used herein, when an element is referred to as being "on," "connected to," "coupled to," or "coupled with" another element, it can be directly on, connected, or coupled with the other element or intervening elements may be present. In contrast, when an element is referred to as being "directly on," "directly connected to" or "directly coupled with" another element, there are no intervening elements or layers present. It will be understood that when an element is referred to as "connecting" or "coupling" a first element and a second element then it is connected to the first element and it is connected to the second element.

Additional non-limiting embodiments include:

Embodiment 1: a heads-up display (HUD) system comprising: a transparent material; an electrochromic element affixed to a surface of the transparent material; and a HUD controller electrically coupled to the electrochromic element and configured to control translucence of the electrochromic element via a control signal and to cause display information to be visible responsive to controlling the translucence of the electrochromic element.

Embodiment 2: the HUD system according to Embodiment 1, further comprising: a user-interface controller configured to govern how the HUD system responds to a user input.

Embodiment 3: the HUD system according to any of Embodiments 1 and 2, comprising a core processing unit, wherein the HUD controller and the user-interface controller are implemented in the core processing unit.

Embodiment 4: the HUD system according to any of Embodiments 1 to 3, wherein the electrochromic element is configured to be in one of a transparent state and an opaque state, and wherein which state the electrochromic element is in is based on an applied voltage differential.

Embodiment 5: the HUD system according to any of Embodiments 1 to 4, wherein the HUD controller is configured to control which state the electrochromic element is in by controlling a voltage differential across contacts of the electrochromic element via the control signal.

Embodiment 6: the HUD system according to any of Embodiments 1 to 5, wherein the HUD controller comprises a microcontroller comprising: a core processing unit; a memory; and one or more peripherals.

Embodiment 7: the HUD system according to any of Embodiments 1 to 6, further comprising a communication unit.

Embodiment 8: the HUD system according to any of Embodiments 1 to 7, further comprising a battery configured to provide power to the HUD controller.

Embodiment 9: the HUD system according to any of Embodiments 1 to 8, further comprising a solar cell configured to provide power to the HUD controller.

Embodiment 10: the HUD system according to any of Embodiments 1 to 9, comprising a sensor configured to take a reading; and wherein the HUD controller to display the display information responsive to the reading.

Embodiment 11: the HUD system according to any of Embodiments 1 to 10, comprising an adhesive configured to affix the electrochromic element to the transparent material.

Embodiment 12: the HUD system according to any of Embodiments 1 to 11, wherein the transparent material includes a transparent surface of a wearable.

Embodiment 13: the HUD system according to any of Embodiments 1 to 12, wherein the transparent material is a windshield of a vehicle.

Embodiment 14: the HUD system according to any of Embodiments 1 to 13, wherein the vehicle comprising a number of subsystems, each of the number of subsystems including a respective additional HUD controller, each of the additional HUD controllers electrically coupled to an additional electrochromic element located affixed to the windshield and configured to control translucence of the additional electrochromic elements via control signals to cause additional display information to be visible.

Embodiment 15: The HUD system according to any of Embodiments 1 to 14, wherein the transparent material is one of: an eyeglass lens, a lens of goggles, or a visor of a helmet.

Embodiment 16: the HUD system according to any of Embodiments 1 to 15, the electrochromic element comprising a number of electrochromic elements affixed to the surface of the transparent material; and wherein the HUD controller is electrically coupled to the number of electrochromic elements and configured to cause additional display information to be visible responsive to controlling the translucence of the number of electrochromic elements.

Embodiment 17: the HUD system according to any of Embodiments 1 to 16, wherein the HUD controller is configured to multiplex control signals to control translucence of two or more of the number of electrochromic elements.

Embodiment 18: a heads-up display (HUD) controller comprising: a processing unit; a memory; and one or more peripherals; wherein the HUD controller is configured to be electrically coupled to an electrochromic element affixed to a surface of a transparent material; and wherein the HUD controller is configured generate a control signal to control translucence of the electrochromic element to display information such that the displayed information is presented in a line of sight that passes through the transparent material.

Embodiment 19: the HUD controller according to Embodiment 18, wherein the HUD controller is configured to receive an input indicative of a reading from a sensor and to display the information responsive to the reading.

Embodiment 20: the HUD controller according to any of Embodiments 18 and 19, comprising a battery.

Embodiment 21: a method of displaying information in a line of sight that passes through a translucent material, the method comprising: affixing an electrochromic element to a surface of a transparent material in a line of sight that passes through the surface of the transparent material; receiving information for display; generating a control signal for controlling a translucence of the electrochromic element to display the information; and controlling the translucence of the electrochromic element thereby displaying the information at the surface of the transparent material by providing the control signal from a heads-up display (HUD) controller to the electrochromic element.

Embodiment 22: the method according to Embodiment 21, comprising refreshing a number of electrochromic displays by: (i) setting common pins of the number of electrochromic displays to high impedance; (ii) setting a common pin of an ith display of the number of electrochromic displays to a low voltage; (iii) setting a first segment-input pin to a high voltage to cause a first corresponding segment of the ith display to activate; (iv) setting a second segment-input pin to high impedance; (v) setting the common pin of the ith display to the high voltage; (vi) setting the second segment-input pin to the low voltage to cause a second corresponding segment of the ith display to deactivate; (vii) setting the first segment-input pin to high impedance; and (viii) repeating the method starting from step (i) replacing the ith display with an (i+1)th display.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A heads-up display (HUD) system comprising:
a transparent material;
an electrochromic element affixed to a surface of the transparent material; and
a HUD controller electrically coupled to the electrochromic element to control translucence of the electrochromic element via a control signal and to cause display information to be visible responsive to controlling the translucence of the electrochromic element, wherein the display information is represented by electrochromic text or electrochromic picture via the electrochromic element.

2. The HUD system of claim 1, comprising: a user-interface controller to govern how the HUD system responds to a user input.

3. The HUD system of claim 2, comprising a core processing unit, wherein the HUD controller and the user-interface controller are implemented in the core processing unit.

4. The HUD system of claim 1, wherein a state of the electrochromic element comprises a transparent state and an opaque state, and wherein the state the electrochromic element is at least partially responsive to an applied voltage differential.

5. The HUD system of claim 4, wherein the HUD controller to control which state the electrochromic element is in by controlling a voltage differential across contacts of the electrochromic element via the control signal.

6. The HUD system of claim 1, wherein the HUD controller comprises a microcontroller comprising:
a core processing unit;
a memory; and
one or more peripherals.

7. The HUD system of claim 1, comprising a communication unit, wherein the display information comprises information received by the communication unit.

8. The HUD system of claim 1, comprising a battery to provide power to the HUD controller.

9. The HUD system of claim 1, comprising a solar cell to provide power to the HUD controller.

10. The HUD system of claim 1, comprising a sensor to take a reading; and wherein the HUD controller to display the display information responsive to the reading.

11. The HUD system of claim 1, comprising an adhesive to affix the electrochromic element to the transparent material.

12. The HUD system of claim 1, wherein the transparent material includes a transparent surface of a wearable.

13. The HUD system of claim 1, wherein the transparent material is a windshield of a vehicle.

14. The HUD system of claim 13, wherein the vehicle further comprising a number of subsystems, each of the number of subsystems including a respective additional HUD controller, each of the additional HUD controllers electrically coupled to an additional electrochromic element located affixed to the windshield and to control translucence of the additional electrochromic elements via control signals to cause additional display information to be visible.

15. The HUD system of claim 1, wherein the transparent material is one of: an eyeglass lens, a lens of goggles, or a visor of a helmet.

16. The HUD system of claim 1, the electrochromic element comprising a number of electrochromic elements affixed to the surface of the transparent material; and wherein the HUD controller is electrically coupled to the number of electrochromic elements to cause additional display information to be visible responsive to controlling the translucence of the number of electrochromic elements.

17. The HUD system of claim 16, wherein the HUD controller to multiplex control signals to control translucence of two or more of the number of electrochromic elements.

18. A heads-up display (HUD) controller comprising:
a processing unit;
a memory; and
one or more peripherals;
wherein the HUD controller to be electrically coupled to an electrochromic element affixed to a surface of a transparent material; and
wherein the HUD controller to generate a control signal to control translucence of the electrochromic element to display information such that the displayed information is presented in a line of sight that passes through the transparent material, wherein the displayed information is represented by electrochromic text or electrochromic picture via the electrochromic element.

19. The HUD controller of claim 18, wherein the HUD controller to receive an input indicative of a reading from a sensor and to display the information responsive to the reading.

20. The HUD controller of claim 18, comprising a battery.

21. A method of displaying information in a line of sight that passes through a translucent material, the method comprising:
affixing an electrochromic element to a surface of a transparent material in a line of sight that passes through the surface of the transparent material;
receiving information for display;
generating a control signal for controlling a translucence of the electrochromic element to display the information; and
controlling the translucence of the electrochromic element thereby displaying the information at the surface of the transparent material by providing the control signal from a heads-up display (HUD) controller to the electrochromic element, wherein displayed information is represented by electrochromic text or electrochromic picture via the electrochromic element.

22. The method of claim 21, comprising refreshing a number of electrochromic displays by:
(i) setting common pins of the number of electrochromic displays to high impedance;
(ii) setting a common pin of an ith display of the number of electrochromic displays to a low voltage;
(iii) setting a first segment-input pin to a high voltage to cause a first corresponding segment of the ith display to activate;
(iv) setting a second segment-input pin to high impedance;
(v) setting the common pin of the ith display to the high voltage;
(vi) setting the second segment-input pin to the low voltage to cause a second corresponding segment of the ith display to deactivate;
(vii) setting the first segment-input pin to high impedance; and
(viii) repeating the method starting from step (i) replacing the ith display with an (i+1)th display.

* * * * *